United States Patent [19]

Aikoh et al.

[11] Patent Number: 5,416,765
[45] Date of Patent: May 16, 1995

[54] OPTICAL HEAD FOR USE IN AN OPTICAL DISK APPARATUS

[75] Inventors: Hideki Aikoh, Higashiosaka; Tohru Nakamura, Katano, both of Japan

[73] Assignee: Matsushita Electric Industrial Co., Ltd., Osaka, Japan

[21] Appl. No.: 188,702

[22] Filed: Jan. 31, 1994

[30] Foreign Application Priority Data

Feb. 15, 1993 [JP] Japan .................................. 5-025321

[51] Int. Cl.⁶ .............................................. G11B 7/135
[52] U.S. Cl. ................................. 369/112; 369/44.23; 369/109
[58] Field of Search ............ 369/103, 109, 112, 44.23, 369/44.37, 44.21, 44.22

[56] References Cited

U.S. PATENT DOCUMENTS 5,050,155  9/1991  Kurata et al. ........................ 369/112
5,231,620  7/1993  Ohuchida ............................ 369/109

OTHER PUBLICATIONS

"Hikari-Jiki Deisuku (magnetooptical disk)", Osamu Imamura, issued from K. K. Torikeppusu, Feb. 20, 1986. (no translation provided).

*Primary Examiner*—Paul M. Dzierzynski
*Assistant Examiner*—Don Wong
*Attorney, Agent, or Firm*—Wenderoth, Lind & Ponack

[57] ABSTRACT

An optical head is mounted in an optical disk apparatus that optically records or reproduces information on or from an information recording medium having a magnetooptical effect. The optical head includes a laser diode for emitting a P-polarized beam and a first hologram element on which the P-polarized beam is incident and which diffracts the P-polarized beam more in zeroth order than in higher orders but diffracts an S-polarized beam perpendicular to the P-polarized beam more in higher orders than in zeroth order. The zeroth order P-polarized beam emitted from the laser diode is focused on the information recording medium by the first hologram element or an objective lens interposed between the first hologram element and the information recording medium. One or more second hologram elements are placed between the first hologram element and the laser diode and split a beam reflected from the information recording medium and then diffracted by the first hologram element into beams having respective planes of polarization perpendicular to each other. A plurality of optical detectors for detecting the beams transmitted through the second hologram elements are disposed in line with the laser diode.

13 Claims, 4 Drawing Sheets

OPTICAL HEAD FOR USE IN AN OPTICAL DISK APPARATUS

BACKGROUND OF THE INVENTION

1. Field of the Invention

The present invention relates to an optical head for use in an optical disk apparatus that optically records or reproduces information on or from an information recording medium.

2. Description of Related Art

There have been many reports on the optical head for use in the optical disk apparatus.

FIG. 4 schematically depicts a conventional optical head operable with a magnetooptical disk 4 having magnetooptical effect. The optical head shown in FIG. 4 comprises a laser diode 1, a beam splitter 2, an objective lens 3 for focusing a beam on the magnetooptical disk 4, a polarized-beam splitter 5, two optical detectors 6a and 6b, and a differential amplifier 7 for outputting information signals from the magnetooptical disk 4.

The conventional optical head of the above-described structure operates as follows.

A beam emitted by the laser diode 1 is transmitted through the beam splitter 2 and focused by the objective lens 3 mounted in an objective lens driving device (not shown) down to a spot of approximately one micrometer in diameter on a magnetooptical layer of the magnetooptical disk 4. Reflected light from the magnetooptical disk 4 passes through the objective lens 3, is partially reflected by the beam splitter 2, and is incident on the polarized-beam splitter 5. The laser diode 1 is placed so that the direction of polarization is parallel to the sheet (P polarization). For efficient reproduction of information stored in the magnetooptical disk 4, the beam splitter 2 is designed, for example, to have a transmittance of 70% and a reflectance of 30% for P polarization, and a transmittance of 0% and a reflectance of 100% for S polarization. This configuration allows approximately 70% of the beam emitted by the laser diode 1 to be focused on the magnetooptical disk 4. 70% of the P-polarized beam reflected on the magnetooptical disk 4 is transmitted by the beam splitter 2 back to the laser diode 1, whereas the rest 30% is reflected by the beam splitter 2 and reaches the optical detectors 6a and 6b through the beam splitter 5. The reflected beam from the magnetooptical disk 4 bearing information signals induced by the magnetooptical effect is S-polarized. For obtaining a higher signal-to-noise ratio (S/N), the reflectance of the beam splitter 2 for S polarization is designed to be 100%.

The reflected beam from the magnetooptical disk 4 is incident on the beam splitter 5 having an optical axis rotated about the incident beam axis by 45 degrees. The incident beam is split by the beam splitter 5 into two polarized beam components having respective planes of polarization perpendicular to each other. One polarized beam component passes through the beam splitter 5 and is incident on the optical detector 6a, whereas the other is reflected by the beam splitter 5 and reaches the optical detector 6b. Signals from the two optical detectors 6a and 6b are fed to the differential amplifier 7, and its output, having a high S/N, represents the information stored in the magnetooptical disk 4.

Although the conventional optical head described above gives rise to a sufficient performance for detection of magnetooptical information signals by making use of a differential detection technique employing the beam splitter 5, it has a few drawbacks as described below. That is, the optical path of the detection system is almost perpendicular to the optical path of the focusing system, as shown in FIG. 4, due to the characteristics of the beam splitter 2 which is designed to provide a high optical transfer efficiency for the focusing system, a high beam intensity to the optical detectors 6a and 6b, and a high S/N, and is also designed to well balance these factors.

Further, each of the beam splitter 2 and the polarized-beam splitter 5 comprises two polished glass elements bonded together, with one of the bonded faces coated with appropriate multi-thin-films. Such elements are expensive because it is difficult to mass-produce, making it difficult to manufacture a small-sized optical head at a low cost.

SUMMARY OF THE INVENTION

The present invention has been developed to overcome the above-described disadvantages.

It is accordingly an object of the present invention to provide a novel optical head that is more compact and of lower cost.

In accomplishing the above and other objects, an optical head according to the present invention comprises a light source for emitting a linearly polarized beam and a first hologram element, spaced apart from the light source, for receiving the linearly polarized beam emitted from the light source and transmitting the linearly polarized beam into a zeroth order component of a first intensity and higher order diffracted components of a second intensity less than the first intensity. The first hologram element focuses the zeroth order component of the linearly polarized beam on the information recording medium and allows a reflected beam from the information recording medium to pass therethrough. The reflected beam from the information recording medium includes first and second polarized beams having respective planes of polarization perpendicular to each other. The plane of polarization of the first polarized beam is parallel to that of the linearly polarized beam. The first hologram element transmits the first polarized beam into a zeroth order component of the first intensity and higher order diffracted components of the second intensity, and also transmits the second polarized beam into a zeroth order component of a third intensity and higher order diffracted components of a fourth intensity greater than the third intensity.

The optical head also comprises a polarized-beam splitting means, disposed between the first hologram element and the light source, for splitting the first and second polarized beams transmitted through the first hologram element, and a detection means for detecting the first and second polarized beams split by the polarized-beam splitting means.

The polarized-beam splitting means may comprise one or more second hologram elements.

Advantageously, the first hologram element may consist essentially of tantalum oxide, while the second hologram element may consist essentially of lithium niobate.

Conveniently, the second hologram element is integrally formed with the first hologram element, and the light source and the detection means are integrated on the same substrate.

The first hologram element may be replaced by a hologram element for receiving the linearly polarized beam emitted from the light source and a focusing means for focusing the zeroth order component of the linearly polarized beam on the information recording medium.

In the optical head described above, the linearly polarized beam, a P-polarized beam, for example, emitted from the light source is incident on the first hologram element, and the zeroth order P-polarized beam transmitted through the first hologram element is focused on the information recording medium. The reflected beam from the information recording medium passes through the first hologram element, and higher order beams diffracted by the first hologram element are incident on the polarized-beam splitting means. The polarized-beam splitting means splits the incident beam into beams having respective planes of polarization perpendicular to each other, of which intensities are measured with the detection means. An output signal from the detection means is indicative of information stored in the information recording medium.

Because the first hologram element diffracts the linearly polarized beam, the P-polarized beam, for example, more in zeroth order than in higher orders but diffracts another linearly polarized beam, an S-polarized beam, for example, that is perpendicular to the P-polarized beam, more in higher orders than in zeroth order. This scheme provides a high optical transfer efficiency for the focusing system, sufficient beam intensities for the detection means, and a high S/N. Further, the optical path for the detection system from the information recording medium to the detection means almost coincides with that of the focusing system from the light source to the information recording medium, resulting in a more compact and less spacious optical head. The resultant compactness necessarily shortens the optical path, which makes the optical head more stable against changes of the environment such as temperatures and moisture. The fact that the hologram elements are easily mass-produced in contrast with the beam splitter using thin-film multicoating reduces the cost of the optical head.

The polarized-beam splitting means becomes compact when the second hologram element made of lithium niobate is employed as such means. It allows the optical head to have a simpler structure and hence further contributes to make the optical head more compact and of lower cost in addition to the aforementioned effects.

When the second hologram element is incorporated on the first hologram element, the optical head also becomes more compact.

Furthermore, when the light source and the detection means are integrated with the substrate, the optical head becomes smaller, and of lower cost in addition to the aforementioned effects. A further advantage is that wiring for the signals from the detection means can be performed more easily on the substrate.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
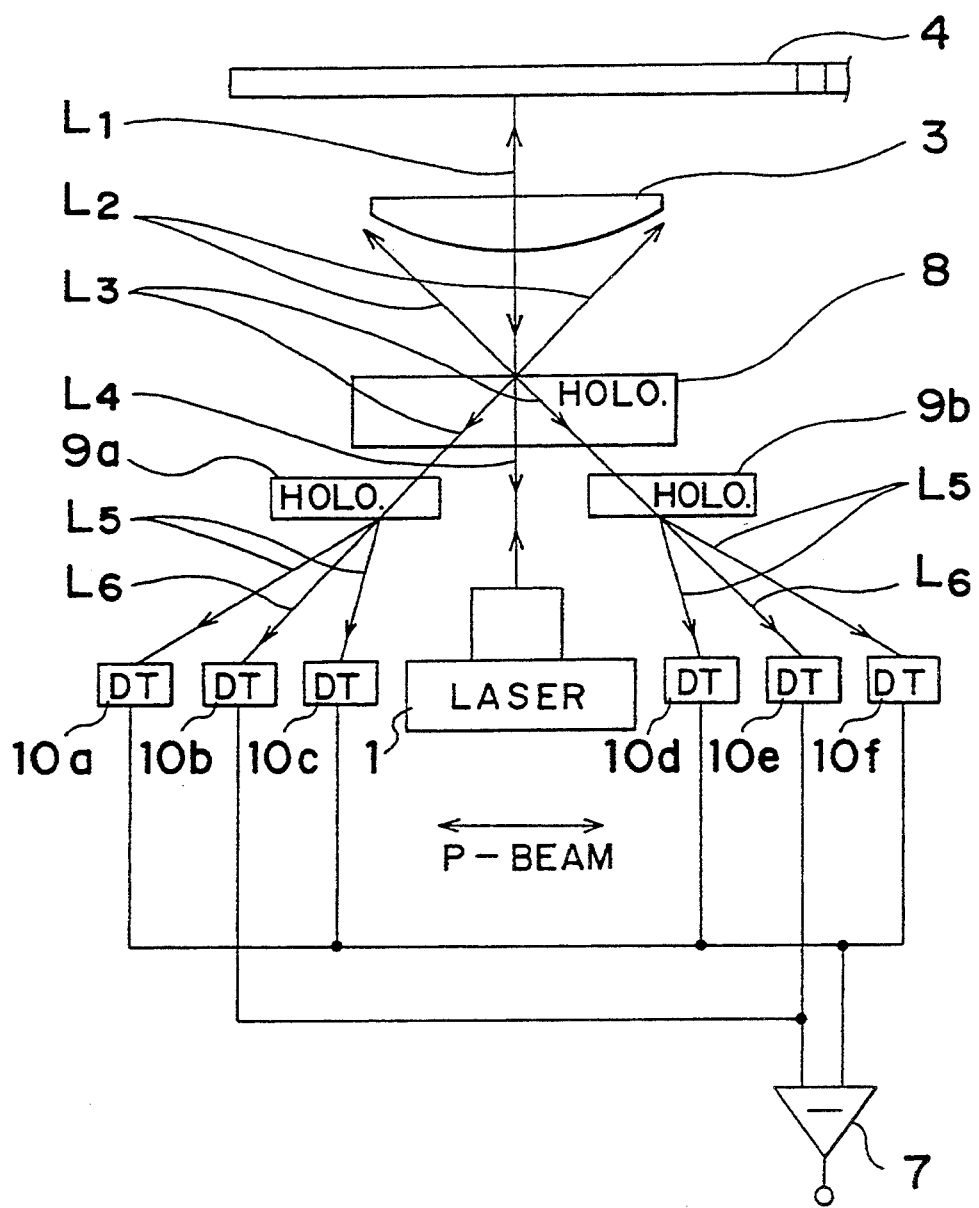
FIG. 1 is a schematic view of an optical head according to a first embodiment of the present invention.

Referring now to the drawings, there is schematically shown in FIG. 1 an optical head according to a first embodiment of the present invention for optically recording or reproducing information on or from an information recording medium having magnetooptical effect.

The optical head shown in FIG. 1 comprises a laser diode 1 employed as a light source for emitting a linearly polarized beam, an objective lens 3, spaced apart from the laser diode 1, for focusing an incident beam on a magnetooptical disk 4 employed as the information recording medium, and a differential amplifier 7 for outputting information signals from the magnetooptical disk 4. The optical head also comprises a first hologram element 8 disposed between the laser diode 1 and the objective lens 3, two second hologram elements 9a and 9b disposed between the laser diode 1 and the first hologram element 8, a first set of, for example three, optical detectors 10a, 10b, and 10c, disposed on one side of the laser diode 1 in line therewith, for receiving a beam transmitted through the second hologram element 9a and diffracted beams therefrom, and a second set of, for example three, optical detectors 10d, 10e, and 10f, disposed on the other side of the laser diode 1 in line therewith, for receiving a beam transmitted through the second hologram element 9b and diffracted beams therefrom.

The first hologram element 8 is operable to allow an incident beam to pass therethrough and diffract it into beam components of various orders including a zeroth order component of a first predetermined intensity and higher order components of a second predetermined intensity other than the zeroth order component, said first and second intensities being different from each other for each of P-polarized and S-polarized beams. On the other hand, each of the second hologram elements 9a and 9b has an optical axis rotated about the incident beam axis by approximately 45 degrees with respect to the direction of polarization of the incident beam and, hence, splits the incident beam into polarized beam components having respective planes of polarization perpendicular to each other. The first hologram element 8 consists essentially of tantalum oxide, whereas each of the second hologram elements 9a and 9b consists essentially of lithium niobate. The first set of optical detectors 10a, 10b, and 10c detect the beam intensities transmitted through and diffracted by the second hologram element 9a, while the second set of optical detectors 10d, 10e, and 10f detect the beam intensities transmitted through and diffracted by the second hologram element 9b.

Lines with arrows in FIG. 1 denote beams, namely L1 is a beam of the zeroth order of the focusing system, L2 diffracted beams of the first order of the focusing system, L3 diffracted beams of the first order of the detection system, L4 a beam of the zeroth order of the detection system, L5 diffracted beams of the first order of S-polarized beams, and L6 beams of the zeroth order of P-polarized beams.

The optical head of the above-described construction operates as follows.

The laser diode 1 emits a linearly polarized beam having a plane of polarization, for example, parallel to the plane of the sheet (P polarization). The P-polarized beam from the laser diode 1 is incident on the first hologram element 8 which is so designed as to be operable to transmit and diffract the incident beam such that, for the P-polarized beam, the intensity of the zeroth order component is greater than that of the higher order components, whereas, for the S-polarized beam, the former is less than the latter. To simplify description, the diffracted beams of the second order and higher orders are neglected, and the following transmittances are assumed: a 70% transmittance for the zeroth order P-polarized beam; a 30% transmittance for the first order diffracted beams of the P-polarized beam; a 0% transmittance for the zeroth order S-polarized beam; and a 100% transmittance for the first order diffracted beams of the S-polarized beam.

Accordingly, in the focusing system, 70% of the P-polarized beam emitted from the laser diode 1 passes, in the form of the zeroth order beam, through the first hologram element 8 and is focused down to a spot of approximately one micrometer in diameter on a magnetooptical layer of the magnetooptical disk 4 by the objective lens 3 mounted in an objective lens driver (not shown). The beam L1 in FIG. 1 denotes this focused beam and ensures a satisfactory optical transfer efficiency. The remaining 30% of the P-polarized beam emitted from the laser diode 1 is diffracted as shown as the first order diffracted beams L2 in FIG. 1 and does not enter the objective lens 3.

It is, however, to be noted that the present invention is applicable to the case wherein the first order diffracted beams L2 entirely or partially enter the objective lens 3.

On the other hand, in the detection system, a reflected beam from the magnetooptical disk 4 is incident back on the first hologram element 8. As is the case with the focusing system, 70% of the P-polarized component of the reflected beam from the magnetooptical disk 4 is transmitted as the zeroth order beam L4 without diffraction and goes back to the laser diode 1, whereas 30% of the P component is incident, as the positive and negative first order diffracted beams L3, on the second hologram elements 9a and 9b, respectively, to thereby ensure a sufficient intensity for the detection system. Information signals on the magnetooptical disk 4 retrieved by the magnetooptical effect are carried by the S-polarized component of the reflected beam from the disk 4. Since the transmittance of the zeroth order component of the S-polarized beam is zero, there is no information signal going back to the laser diode 1, and all the S-polarized beam is incident, as the positive and negative first order diffracted beams L3, on the second hologram elements 9a and 9b, respectively, to thereby ensure a high S/N.

Each of the second hologram elements 9a and 9b operates as means for splitting the incident beam into two polarized components which have a generally equal intensity and also have respective planes of polarization perpendicular to each other. More specifically, each of the second hologram elements 9a and 9b splits the incident beam into the P- and S-polarized beams, and allows the P-polarized beam to pass straight therethrough as the zeroth order beam L6, and diffracts the S-polarized beam mostly as the positive and negative first order diffracted beams L5. In the strict sense, since the second hologram elements 9a and 9b made of lithium niobate diffract the S-polarized beam also in higher orders, higher order diffracted beams such as, for example, the third order diffracted beam, the fifth order diffracted beam, and the like must be detected for full utilization of the S-polarized beam. In the present description, however, only the first order is considered for simplicity, as is the case with the first hologram element 8.

The zeroth order beams (P-polarized beams) L6 transmitted through the second hologram elements 9a and 9b are incident on the optical detectors 10b and 10e, respectively, while the first order diffracted beams (S-polarized beams) L5 transmitted through the second hologram elements 9a and 9b are incident on the optical detectors 10a and 10c, and 10d and 10f, respectively. The sum of signals from the optical detectors 10b and 10e is fed into an input of the differential amplifier 7, whereas the sum of signals from the optical detectors 10a, 10c, 10d, and 10f into the other input. The differential amplifier 7 outputs a differential signal having a high S/N and indicating an information signal recorded on the magnetooptical disk 4.

In this embodiment, the first hologram element 8 is designed so that it diffracts the P-polarized beam more in zeroth order than in higher orders but diffracts the S-polarized beam more in higher orders than in zeroth order. Therefore, it gives rise to a high optical transfer efficiency of the focusing system including the objective lens 3, sufficient beam intensities on the optical detectors 10a, 10b, 10c, 10d, 10e, and 10f, and a high S/N.

Further, the first hologram element 8 allows the optical path of the focusing system, which includes the components the emitted beam passes through from the laser diode 1 up to the information recording medium 4, to lie close to the optical path of the detection system which includes the components the reflected beam from the medium 4 passes through from the medium 4 up to the optical detectors 10a, 10b, 10c, 10d, 10e, and 10f. This results in a more compact and less spacious optical head. This means that the length of the optical path is shortened and, hence, the optical head becomes more stable against changes of the environment such as temperatures and moisture.

Since hologram elements are easily mass-produced in contrast with beam splitters which use thin-film multicoating, the cost of the optical head can be reduced.

The same advantages in compactness, space, and cost are obtained from the second hologram elements 9a and 9b employed as the polarized-beam splitting means.

Although in this embodiment we assume that the second hologram elements 9a and 9b are made of lithium niobate, any other beam splitting means may be used, if they split a polarized beam into beams having approximately the same intensities and respective planes of polarization perpendicular to each other. For this purpose, prisms, optical filters or any other suitable means may be employed.

Assume, for example, the second hologram element 9a is so designed that the P-polarized beam transmitted therethrough forms a zeroth order beam and is incident on the optical detector 10b, whereas the S-polarized beam transmitted therethrough forms first order diffracted beams and are incident on the optical detectors 10a and 10c. Assume also that the second hologram element 9b is so designed that the S-polarized beam transmitted therethrough forms a zeroth order beam and is incident on the optical detector 10e, whereas the P-polarized beam transmitted therethrough forms first order diffracted beams and are incident on the optical detectors 10d and 10f. In this case, wiring to the differential amplifier 7 is different from that illustrated in FIG. 1. This configuration is of advantage to detection of servo signals, which is not described in FIG. 1. More specifically, when the servo signals are detected in the configuration shown in FIG. 1 by the use of the symmetrically arranged optical detectors 10b and 10e, one measures only P-polarized beams, which are subject to influence of retardation of the magnetooptical disk 4. When one measures the servo signals with the P-polarized beam incident on the optical detector 10b and the S-polarized beam on the optical detector 10e, however, the effect of the retardation of the magnetooptical disk 4 is reduced.

Figure 2:
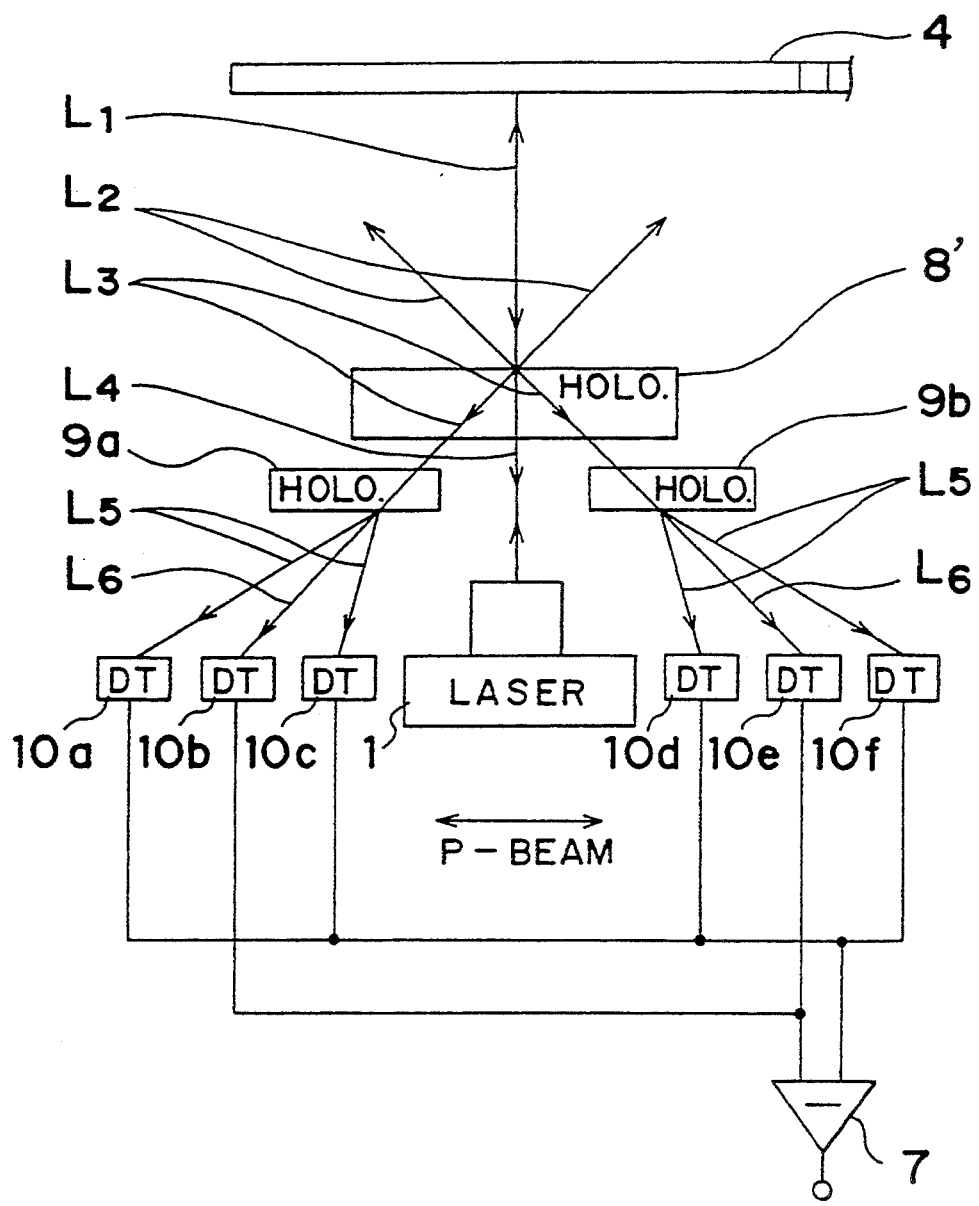
FIG. 2 is a view similar to FIG. 1, but according to a second embodiment of the present invention.

FIG. 2 illustrates an optical head according to a second embodiment of the present invention.

The optical head shown in FIG. 2 is of a structure somewhat analogous to that of the optical head shown in FIG. 1, but differs from the latter in that the optical head shown in FIG. 2 has no objective lens, and a first hologram element 8' provided therein has a function of focusing a beam emitted from the laser diode 1 on the magnetooptical disk 4.

Alternatively, the first hologram element 8' may be replaced by two hologram elements integrally formed with each other. In this case, the two hologram elements function as the objective lens 3 and the first hologram element 8 shown in FIG. 1, respectively.

Figure 3:
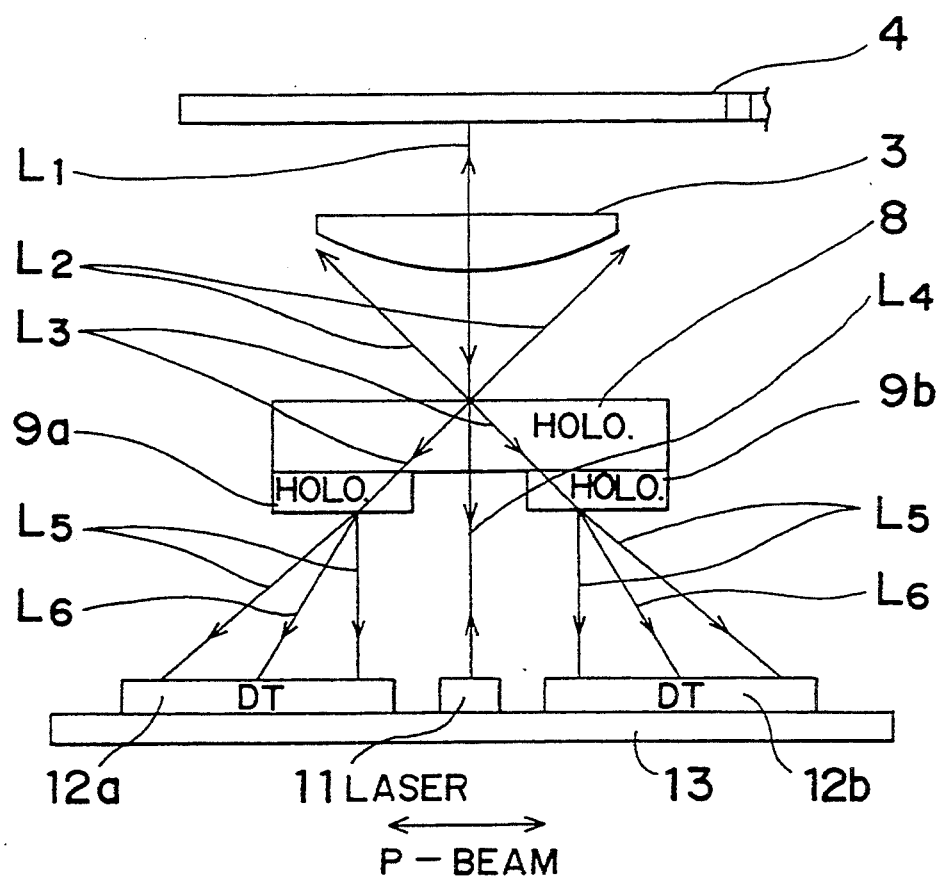
FIG. 3 is a view similar to FIG. 1, but according to a third embodiment of the present invention.
Figure 4:
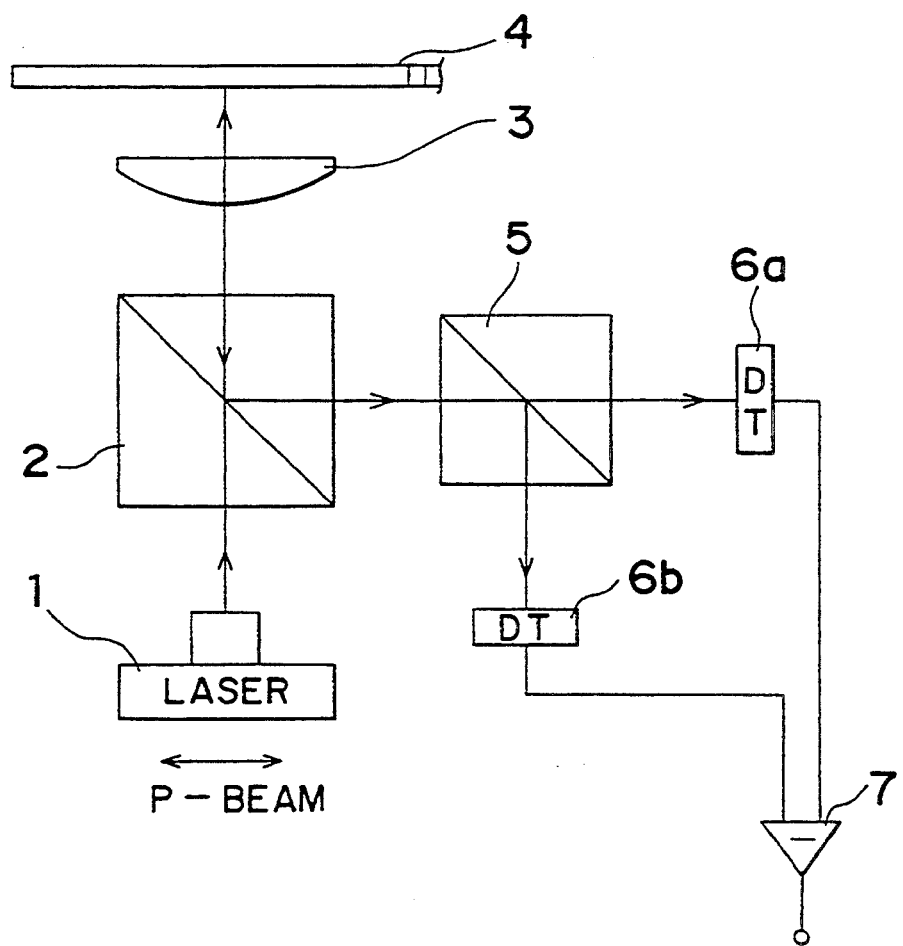
FIG. 4 is a schematic view of a conventional optical head.

FIG. 3 illustrates an optical head according to a third embodiment of the present invention. The differences from FIG. 1 are that a laser diode chip 11 as a light source and two optical detector chips 12a and 12b are integrated on the same substrate 13 and that the second hologram elements 9a and 9b are integrally formed with the first hologram element 8. In this configuration, the zeroth order beam L6 (P-polarized beam) and the first order diffracted beams L5 (S-polarized beam) transmitted through the hologram element 9a are incident on the optical detector chip 12a placed on the substrate 13. Likewise, the zeroth order beam L6 (P-polarized beam) and the first order diffracted beams L5 (S-polarized beam) transmitted through the hologram element 9b are incident on the optical detector chip 12b placed on substrate 13.

Each of the optical detector chips 12a and 12b has three light receiving areas for receiving associated beam components. The total signal from the whole light receiving areas for the P-polarized beam and the total signal from the whole light receiving areas for the S-polarized beam are fed into the differential amplifier (not shown in FIG. 3), which outputs a differential signal of those two signals indicative of an information signal having a high S/N and reproduced from the information stored on the magnetooptical disk 4.

According to this embodiment, because the laser diode chip 11 employed as a light source and the optical detector chips 12a and 12b are integrated together on the same substrate 13, the optical head can be made more compact, less spacious, of less cost than the previous embodiments. Further, because wires leading to the optical detector chips 12a and 12b can be laid on the substrate 13, the wiring process will become simpler.

Incorporating the second hologram elements 9a and 9b on the first hologram element 8 further makes the optical head more compact.

Further improvement in compactness and space will be realized by incorporating the objective lens 3 on the first hologram element 8 or by replacing the objective lens 3 and the first hologram element 8 by the hologram element 8' shown in FIG. 2.

It is to be noted that, in the embodiments illustrated in FIGS. 1 to 3, although a transmissive hologram is employed for the first hologram element 8 or 8', a reflective hologram can also be used.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An optical head for use in an optical disk apparatus for optically recording or reproducing information on or from an information recording medium having magnetooptical effect, said optical head comprising:

a light source for emitting a linearly polarized beam;

a first hologram element, spaced apart from said light source, for receiving the linearly polarized beam emitted from said light source and transmitting the linearly polarized beam into a zeroth order component of a first intensity and higher order diffracted components of a second intensity less than said first intensity, said first hologram element focusing the zeroth order component of the linearly polarized beam on the information recording medium and allowing a reflected beam from the information recording medium to pass therethrough, said reflected beam including first and second polarized beams having respective planes of polarization perpendicular to each other, the plane of polarization of said first polarized beam being parallel to that of said linearly polarized beam, said first hologram element transmitting said first polarized beam into a zeroth order component of the first intensity and higher order diffracted components of the second intensity and also transmitting said second polarized beam into a zeroth order component of a third intensity and higher order diffracted components of a fourth intensity greater than said third intensity;

a polarized-beam splitting means, disposed between said first hologram element and said light source, for splitting said first and second polarized beams transmitted through said first hologram element; and a detection means for detecting said first and second polarized beams split by said polarized-beam splitting means.

2. The optical head according to claim 1, wherein said first hologram element consists essentially of tantalum oxide.

3. The optical head according to claim 1, wherein said polarized-beam splitting means comprises at least one second hologram element.

4. The optical head according to claim 3, wherein said second hologram element is integrally formed with said first hologram element.

5. The optical head according to claim 3, wherein said second hologram element consists essentially of lithium niobate.

6. The optical head according to claim 1, further comprising a substrate with which said light source and said detection means are integrated.

7. An optical head for use in an optical disk apparatus for optically recording or reproducing information on or from an information recording medium having magnetooptical effect, said optical head comprising:
   a light source for emitting a linearly polarized beam;
   a first hologram element, spaced apart from said light source, for receiving the linearly polarized beam emitted from said light source and transmitting the linearly polarized beam into a zeroth order component of a first intensity and higher order diffracted components of a second intensity less than said first intensity;
   a focusing means for focusing the zeroth order component of the linearly polarized beam on the information recording medium;
   said first hologram element allowing a reflected beam from the information recording medium to pass therethrough, said reflected beam including first and second polarized beams having respective planes of polarization perpendicular to each other, the plane of polarization of said first polarized beam being parallel to that of the linearly polarized beam, said first hologram element transmitting said first polarized beam into a zeroth order component of the first intensity and higher order diffracted components of the second intensity and also transmitting said second polarized beam into a zeroth order component of a third intensity and higher order diffracted components of a fourth intensity greater than said third intensity;
   a polarized-beam splitting means, disposed between said first hologram element and said light source, for splitting said first and second polarized beams transmitted through said first hologram element; and
   a detection means for detecting said first and second polarized beams split by said polarized-beam splitting means.

8. The optical head according to claim 7, wherein said first hologram element consists essentially of tantalum oxide.

9. The optical head according to claim 7, wherein said first hologram element and said focusing means are integrally formed with each other.

10. The optical head according to claim 7, wherein said polarized-beam splitting means comprises at least one second hologram element.

11. The optical head according to claim 10, wherein said second hologram element is integrally formed with said first hologram element.

12. The optical head according to claim 10, wherein said second hologram element consists essentially of lithium niobate.

13. The optical head according to claim 7, further comprising a substrate with which said light source and said detection means are integrated.

* * * * *